United States Patent
Yahdav et al.

(10) Patent No.: US 12,335,654 B2
(45) Date of Patent: *Jun. 17, 2025

(54) ACCESSIBILITY MEASUREMENT SYSTEM

(71) Applicant: Airbnb, Inc., San Francisco, CA (US)

(72) Inventors: Ortal Yahdav, San Rafael, CA (US); Hilary Catherine Sun, San Francisco, CA (US); Aishwarya Nirmal, Seattle, WA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,903

(22) Filed: May 1, 2024

(65) Prior Publication Data
US 2024/0283889 A1 Aug. 22, 2024

Related U.S. Application Data

(63) Continuation of application No. 17/665,993, filed on Feb. 7, 2022, now Pat. No. 12,010,454.

(51) Int. Cl.
| | |
|---|---|
| G01B 11/22 | (2006.01) |
| G01C 19/00 | (2013.01) |
| G01P 15/00 | (2006.01) |
| G06Q 30/0601 | (2023.01) |
| G06T 7/50 | (2017.01) |
| H04N 5/272 | (2006.01) |
(Continued)

(52) U.S. Cl.
CPC .............. *H04N 5/272* (2013.01); *G01B 11/22* (2013.01); *G01C 19/00* (2013.01); *G01P 15/00* (2013.01); *G06Q 30/0641* (2013.01); *G06T 7/50* (2017.01); *H04N 23/633* (2023.01); *H04N 23/64* (2023.01)

(58) Field of Classification Search
None
See application file for complete search history.

(56) References Cited

U.S. PATENT DOCUMENTS

| | | | |
|---|---|---|---|
| 7,392,205 B1 | 6/2008 | Forward | |
| 11,080,879 B1 * | 8/2021 | Dryer | ...................... G06T 13/00 |
| 11,386,569 B2 * | 7/2022 | Shea | .......................... G06T 7/60 |

(Continued)

OTHER PUBLICATIONS

"U.S. Appl. No. 17/196,690, Notice of Allowability mailed Feb. 28, 2024", 4 pgs.

(Continued)

*Primary Examiner* — David H Chu
(74) *Attorney, Agent, or Firm* — Schwegman Lundberg & Woessner, P.A.

(57) ABSTRACT

Systems and methods are provided to analyze at least one sensor of a computing device to determine that the computing device is in a substantially flat position on the first surface, activate a camera comprising a depth sensor, and detect a second surface in a camera view of the camera. The computing device further analyzes pixel measurements from the depth sensor in a predefined area of the detected second surface to determine a minimum measurement of all of the pixel measurements in the predefined area of the detected surface, causes display of the minimum measurement from the first surface to the second surface overlaid on an image of the first and second surface in the camera view on a user interface of the computing device, and captures an image of the display.

20 Claims, 12 Drawing Sheets

(51) Int. Cl.
*H04N 23/60* (2023.01)
*H04N 23/63* (2023.01)

(56) References Cited

U.S. PATENT DOCUMENTS

| | | |
|---|---|---|
| 2010/0049366 A1 | 2/2010 | Lee et al. |
| 2012/0307859 A1 | 12/2012 | Gogolla |
| 2014/0125577 A1 | 5/2014 | Hoang et al. |
| 2014/0300722 A1 | 10/2014 | Garcia |
| 2016/0147408 A1 | 5/2016 | Bevis et al. |
| 2017/0097228 A1 | 4/2017 | Prochoda |
| 2018/0229833 A1 | 8/2018 | Kimchi et al. |
| 2019/0188919 A1 | 6/2019 | Fink et al. |
| 2020/0258144 A1 | 8/2020 | Chaturvedi et al. |
| 2020/0273084 A1 | 8/2020 | Annakov et al. |
| 2021/0134039 A1 | 5/2021 | Tan et al. |
| 2021/0372772 A1 | 12/2021 | Ahn |
| 2022/0261066 A1 | 8/2022 | Dryer et al. |
| 2023/0254439 A1 | 8/2023 | Yahdav et al. |

OTHER PUBLICATIONS

"U.S. Appl. No. 17/665,993, Non Final Office Action mailed Aug. 3, 2023".

"U.S. Appl. No. 17/665,993, Notice of Allowance mailed Feb. 6, 2024", 7 pgs.

"U.S. Appl. No. 17/665,993, Response filed Oct. 31, 2023 to Non Final Office Action mailed Aug. 3, 2023", 9 pgs.

Bosch Professional Power Toolsuk, "Bosch MeasureOn App-All information in one hand.", https://www.youtube.com/watch?v=qO-Sz9Rqqpc, (Mar. 5, 2021).

\* cited by examiner

500

PLACE THE BACK OF YOUR PHONE AGAINST ONE SIDE OF THE DOORFRAME.

CONTINUE

TILT YOUR PHONE A LITTLE MORE TO THE RIGHT.

ACCESSIBILITY MEASUREMENT SYSTEM

PRIORITY

This application is a continuation of U.S. patent application Ser. No. 17/665,993, filed Feb. 7, 2022, which is incorporated by reference herein in its entirety.

BACKGROUND

An online marketplace may provide a number of services, such as accommodations, tours, transportation and the like, and allow users to reserve or "book" one or more services. For example, a first user (e.g., host) can list one or more services on the online marketplace and a second user (e.g., guest) can request to view listings of services for a particular location (e.g., San Francisco) that may include a listing for the first user's service. Accessibility features in a listing are hard to determine or verify.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
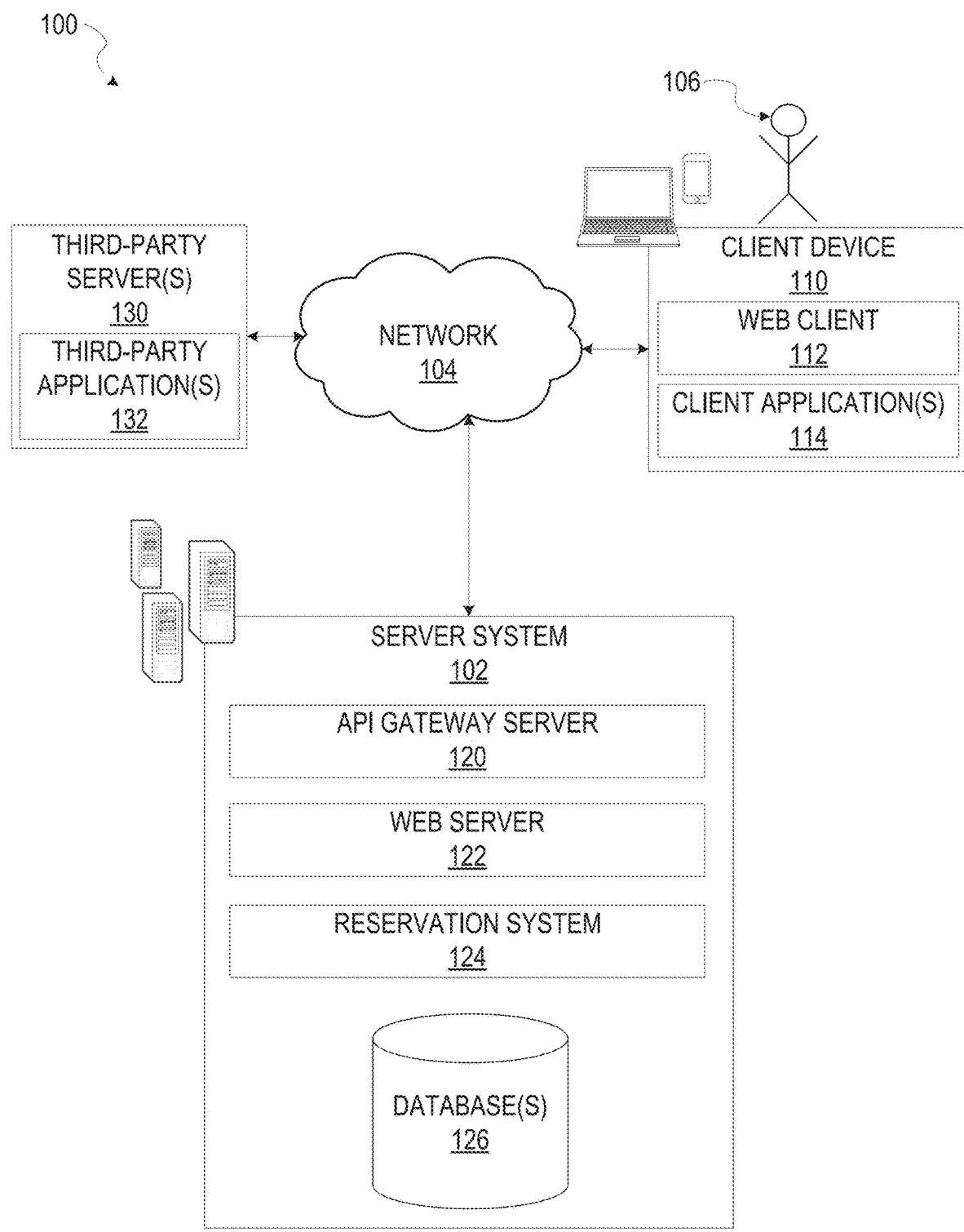
FIG. 1 is a block diagram illustrating a networked system, according to some example embodiments.

Systems and methods described herein relate to an accessibility measurement system for generating accessibility measurements for a new or existing listing (e.g., accommodations, tours, transportation) on an online marketplace. Accessibility refers to features of listings for accommodations, transportation, or other services that enable independent movement for people with disabilities. Some examples of accessibility features include doorways wide enough to accommodate a wheelchair; countertop, bed, toilet and other amenity heights to accommodate a wheelchair or access from a wheelchair; a steepness of a ramp; the absence of stairs; and the like. As explained above, Accessibility features in a listing are hard to determine or verify. For example, an online marketplace or guest cannot easily verify from photos whether a doorway is wide enough for wheelchair access or whether a bed, counter, or other amenities is accessible for all guests, and particularly those with disabilities.

Accessibility features are both very important to a guest or user with accessibility needs for an accommodation or activity in an online marketplace and difficult to verify. For example, a listing in an online marketplace typically has multiple images depicting the outdoor and indoor spaces and amenities for the listing. It is not possible to tell, however, the width of a doorway or the height of a bed, for example, from the images because getting an accurate measure from a photograph with no sense of scale or perception is nearly impossible. Thus, a guest or user trying to book the accommodation does not know whether he or she would be able to move through the space of the accommodation or use the amenities in the accommodation. Moreover, if a listing states that it is accessible, but it is not, the guest would not just have a bad experience in the accommodation but may not be able to stay in the place at all.

Example embodiments described herein address these and other issues by providing an accessibility measurement system for accurately generating accessibility measurements for a new or existing listing on an online marketplace. For instance, example embodiments provide for a computing device to analyze at least one sensor of the computing device to determine that the computing device is in a substantially flat position on the first surface, activate a camera of the computing device comprising a depth sensor, and detect a second surface in a camera view of the camera. The computing device further analyzes pixel measurements from the depth sensor in a predefined area of the detected second surface to determine a minimum measurement of all of the pixel measurements in the predefined area of the detected surface, causes display of the minimum measurement from the first surface to the second surface overlaid on an image of the first and second surface in the camera view on a user interface of the computing device, and captures an image of the display of the measurement from the first surface to the second surface overlaid on the image of the first and second surface.

FIG. 1 is a block diagram illustrating a networked system 100, according to some example embodiments. The networked system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multiprocessor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information, accommodation information, and so forth, associated with travel. The client device 110 may also be a device of a user that is used to post and maintain a listing for a service, request and receive reservation information and guest information, generate accessibility measurements, and so forth.

One or more users 106 may be a person, a machine, or other means of interacting with the client device 110. In example embodiments, the user 106 may not be part of the networked system 100 but may interact with the networked system 100 via the client device 110 or other means. For instance, the user 106 may provide input (e.g., voice input, touch screen input, alphanumeric input) to the client device 110 and the input may be communicated to other entities in the networked system 100 (e.g., third-party servers 130, a server system 102) via a network 104. In this instance, the other entities in the networked system 100, in response to receiving the input from the user 106, may communicate information to the client device 110 via the network 104 to be presented to the user 106. In this way, the user 106 may interact with the various entities in the networked system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the internet, a portion of the public switched telephone network (PSTN), a cellular telephone network, a wireless network, a Wi-Fi network, a WiMAX network, another type of network, or a combination of two or more such networks.

The client device 110 may access the various data and applications provided by other entities in the networked system 100 via a web client 112 (e.g., a browser, such as the Internet Explorer® browser developed by Microsoft® Corporation of Redmond, Washington) or one or more client applications 114. The client device 110 may include one or more client applications 114 (also referred to as "apps") such as, but not limited to, a web browser, a messaging application, an electronic mail (email) application, an ecommerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the networked system 100 (e.g., third-party servers 130, the server system 102), on an as-needed basis, for data and/or processing capabilities not locally available (e.g., to access reservation or listing information, request data, authenticate a user 106, verify a method of payment). Conversely, one or more client applications 114 may not be included in the client device 110, and then the client device 110 may use its web browser to access the one or more applications hosted on other entities in the networked system 100 (e.g., third-party servers 130, the server system 102).

The networked system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102.

The server system 102 may provide server-side functionality via the network 104 (e.g., the internet or a WAN) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. The online marketplace may provide various listings for trip items, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace may further provide listings for other trip items, such as experiences (e.g., local tours), car rentals, flights, public transportation, and other transportation or activities related to travel.

The server system 102 may include the API gateway server 120, a web server 122, and a reservation system 124 that may be communicatively coupled with one or more databases 126 or other forms of data store.

The one or more databases 126 may be one or more storage devices that store data related to the reservation system 124 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage in some embodiments.

The reservation system 124 manages resources and provides back-end support for third-party servers 130, third-party applications 132, client applications 114, and so forth, which may include cloud-based applications. The reservation system 124 provides functionality for viewing listings related to trip items (e.g., accommodation listings, activity listings), generating and posting a new listing, analyzing and ranking images to be posted in a new listing, managing listings, booking listings and other reservation functionality, and so forth, for an online marketplace. Further details related to the reservation system 124 are shown in FIG. 2.

Figure 2:
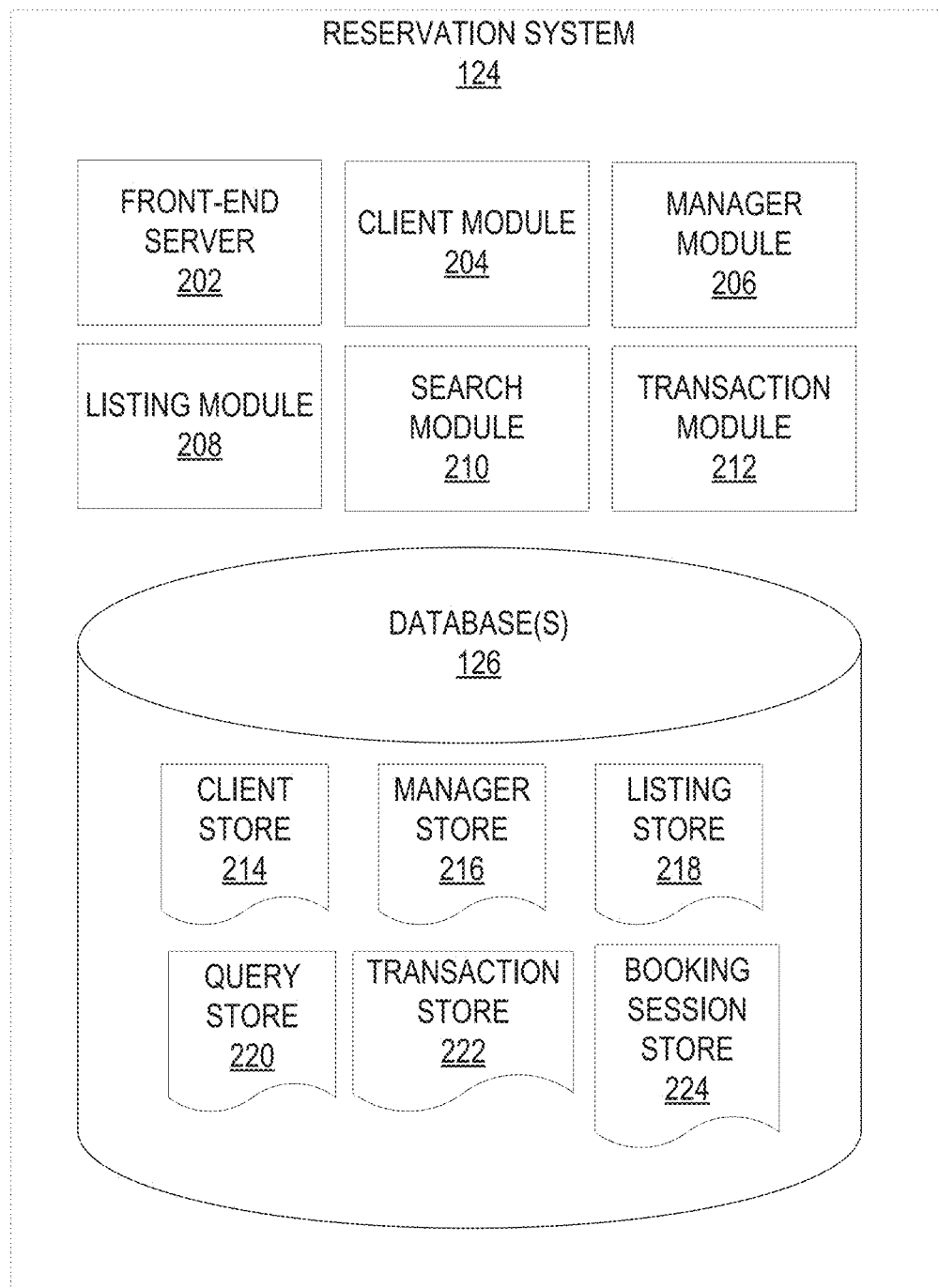
FIG. 2 is a block diagram illustrating a reservation system, according to some example embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in nontransitory computer-readable storage devices such as solid-state devices or magnetic storage devices and executed by the processors to perform the functions described herein.

The front-end server 202 includes program code that allows client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, and so forth. The client's geographical location is either the client's current location (e.g., based on information provided by the client device 110) or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and descriptions that characterize the inventory; and any other relevant information. For example, for an accommodation reservation system, a listing may include a type of accommodation (e.g., house, apartment, room, sleeping space, or other), a representation of its size (e.g., square footage, number of rooms), the dates that the accommodation is available, and a price (e.g., per night, per week, per month). The listing module 208 allows a user 106 to include additional information about the inventory, such as videos, photographs, and other media, or such as accessibility and other information.

The geographical location associated with the listing identifies the complete address, neighborhood, city, and/or country of the offered listing. The listing module 208 is also capable of converting one type of location information (e.g., mailing address) into another type of location information (e.g., country, state, city, neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory). Information from each listing calendar is stored in the listing store 218.

Figure 3:
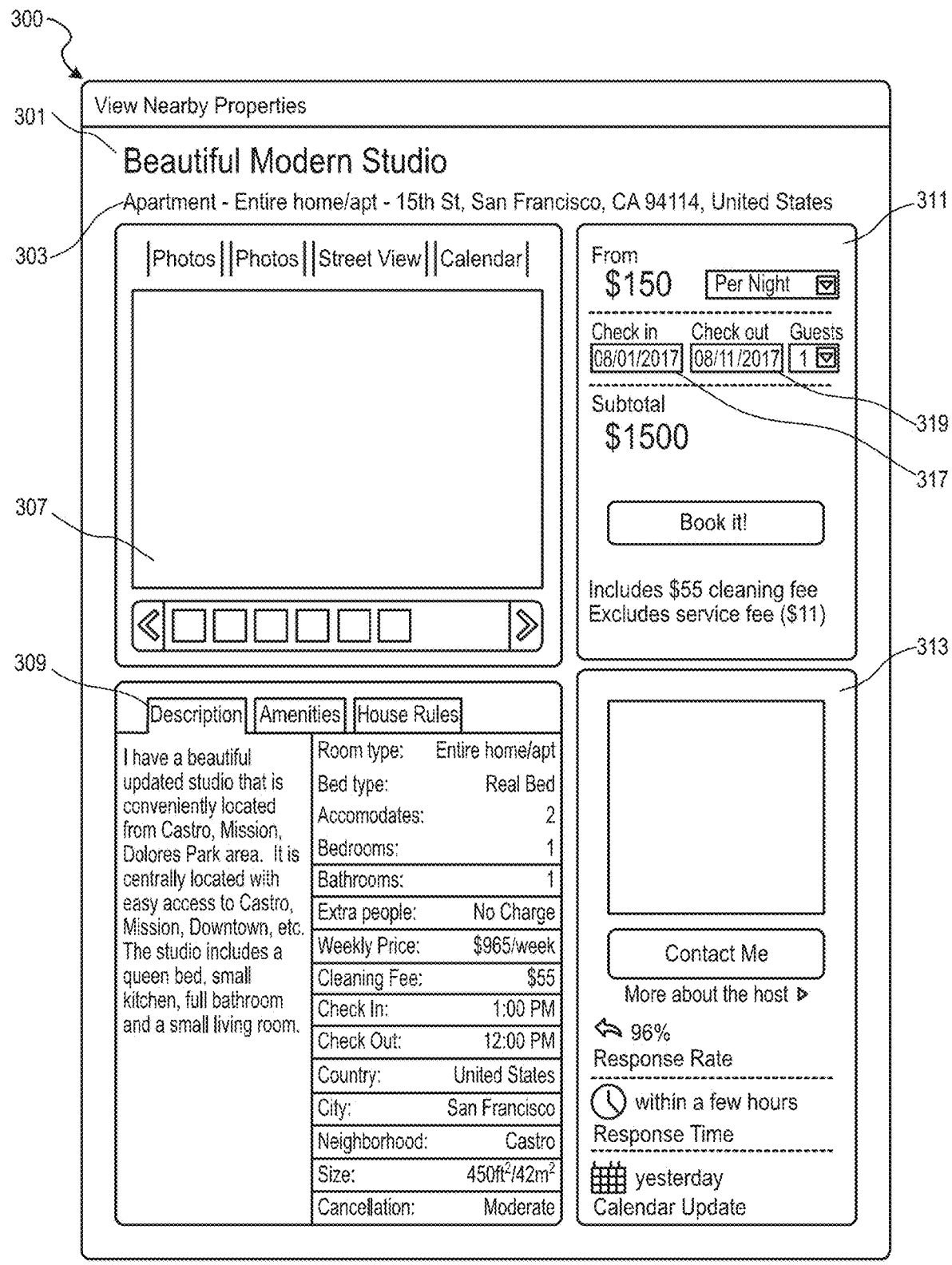
FIG. 3 illustrates an example user interface displaying an example listing for an accommodation in an online marketplace, according to some example embodiments.

FIG. 3 illustrates an example user interface 300 for a description of a listing for a trip item (e.g., an apartment in San Francisco) in an online marketplace. The example listing shown in FIG. 3 is for accommodations in San Francisco. In other examples, the listing could be for a tour, local experience, transportation service, or other trip item. The listing may include a title 301 and a brief description 303 of the trip item. The listing may further include photos of the trip item, maps of the area or location associated with the trip item, a street view of the trip item, a calendar for the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively, which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and, in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Figure 4:
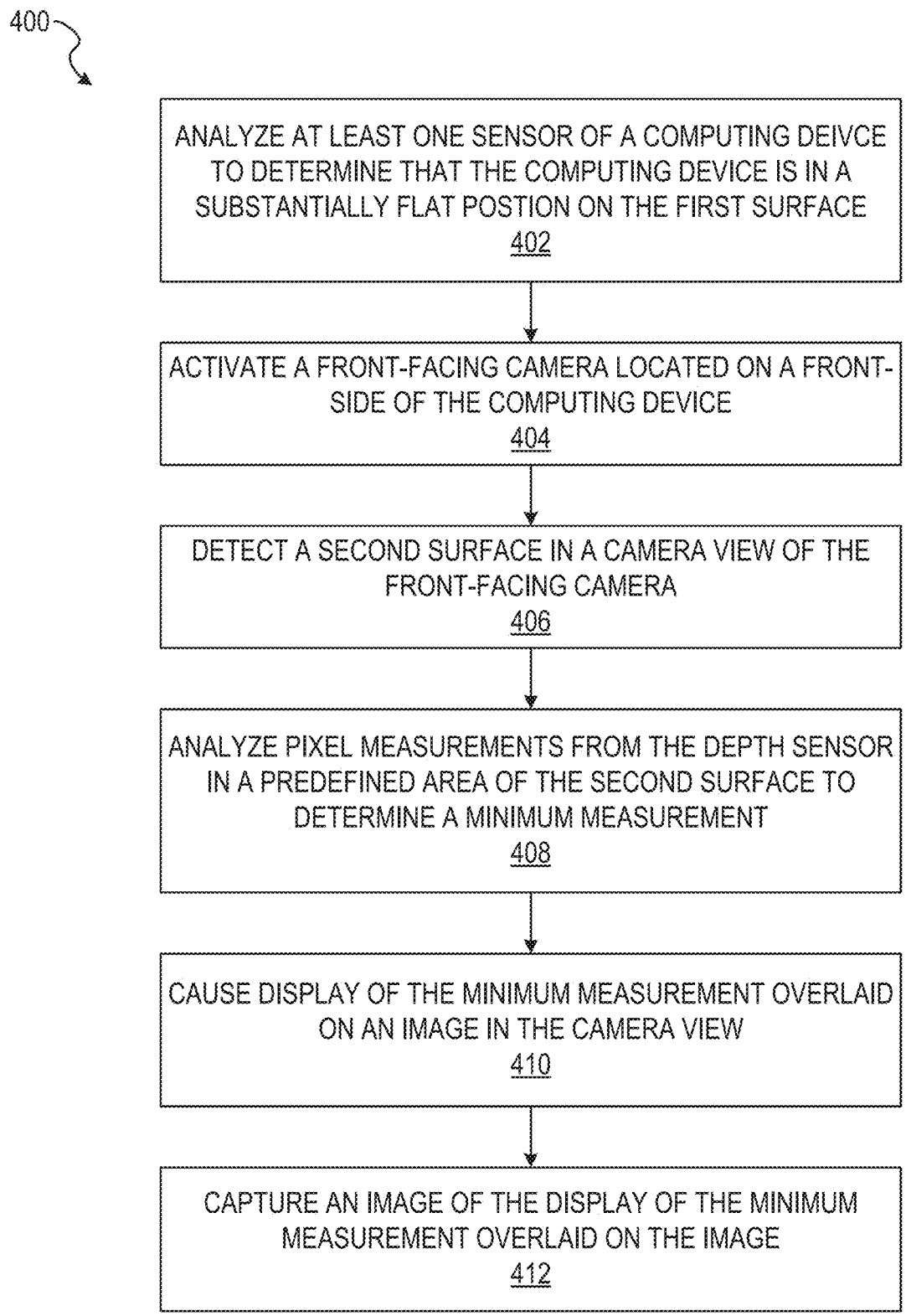
FIG. 4 is a flow chart illustrating aspects of a method for generating accessibility measures, according to some example embodiments.

FIG. 4 is a flow chart illustrating aspects of a method 400 for generating accessibility measures, according to some example embodiments. For illustrative purposes, the method 400 is described with respect to the networked system 100 of FIG. 1 and the reservation system 124 of FIG. 2. It is to be understood that the method 400 may be practiced with other system configurations in other embodiments.

A user, such as a host for an accommodation, tour, transportation, or other service, may start a new listing or have an existing listing in an online marketplace. For example, a user may post a new listing or have an existing listing for an apartment in San Francisco and wish to include accessibility information for the listing. The user may use a computing device, such as a smartphone, that is used to capture photographs of the space for this listing. In another example, a guest in the accommodation can provide the accessibility information using a computing device. One accessibility feature for the listing is the measurements of a doorway or other entry or access point. Other measurements may include the height of certain amenities, a ramp grade or angle, among other features.

Using the doorway or other access point measurement as an example, the computing device may prompt the user to place the computing device on a first surface, such as a first side of a doorway, hallway, or other entry point. In one example, a back-side of the computing device is requested to be placed on the first surface so that a front-facing camera on the front side of the computing device can be used to compute a measurement of the doorway. It is to be understood that the opposite could be requested; to place the front-side of the computing device on the first surface and using a back-facing camera in embodiments described herein. Also, a single camera could be used that is located on the computing device and placed so that the camera can be used to compute the measurement of the doorway, in example embodiments described herein.

Figure 5:
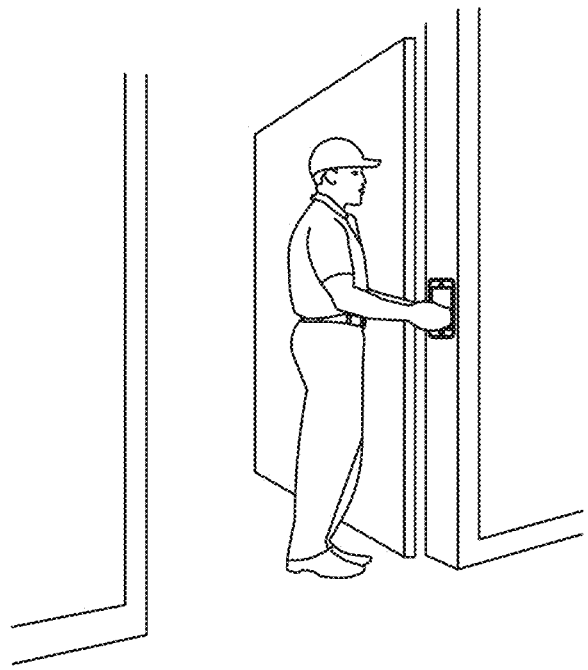
FIGS. 5-10 each illustrate an example user interface, according to some example embodiments.

FIG. 5 illustrates an example user interface 500 on a computing device that prompts a user to place the computing device (e.g., the back of the phone or the front of the phone) against one side of the doorframe. In one example, the computing device uses voice prompts to prompt a user to place the computing device against one side of the doorframe.

Figure 6:
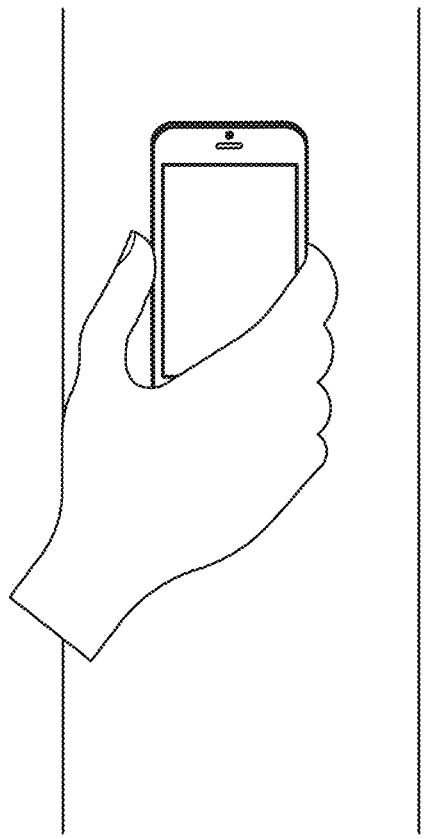

In one example, the computing device detects that the computing device is in a substantially vertical position (e.g., within the range of 20" to 40") and can assume that the computing device is placed on the doorframe. In another example, the computing device uses a machine vision model to detect an opposite side of the door frame via the camera (e.g., front-facing camera, or rear-facing camera) to determined that the computing device is placed on the doorframe. In one example, the computing device can detect that the computing device is placed on the doorframe using a combination of determining that the computing device is in a substantially vertical position, there is little to no movement of the device (e.g., it is resting on something other than being held in a user's hand), and a doorframe is detected on the opposite side of the phone. Once the user has placed the computing device on the first surface (e.g., the one side of the doorframe), the computing device may instruct the user to hold the computing device still on the surface, as shown in the example user interface 600 in FIG. 6 or via voice prompts.

In operation 402, a computing device (e.g., client device 110) analyzes at least one sensor of the computing device to determine that the computing device is in a substantially flat position. For example, the computing device may have an accelerometer, gyroscope, and/or other sensor for determining an orientation of the computing device. The computing device analyzes the pitch, yaw, and roll data output by one or more of these sensors to determine when the computing device is at zero or close to zero (e.g., −0.5 to +0.5) on an x, y, z axis. In one example, the computing device displays a user interface with instructions showing a value or other indicator showing whether or not the computing device is in a substantially flat position.

Figure 7:
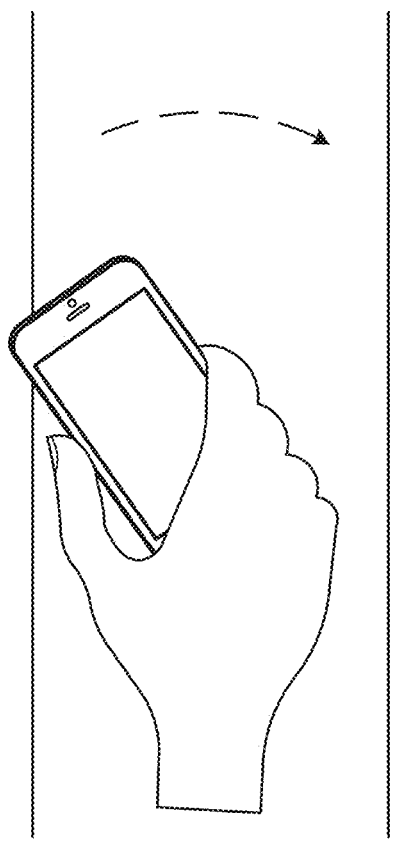

In one example, the computing device may determine that the user is having trouble getting the computing device to be in a substantially flat position. For example, the computing device may determine that a predefined period of time has passed since the user placed the computing device on the surface; the pitch, yaw, and roll are not within the threshold range to be considered substantially flat; or the like. Upon this determination, the computing device instructs, via the user interface, that the user remove any case that is on the computing device. In another example, the computing device provides tips in the user interface to help the user get the phone in a substantially flat position, such as to tilt the computing device in a certain way or direction, as shown in the example user interface 700 of FIG. 7. In yet another example, the computing device provides an option for selection indicating that the computing device is in a substantially flat position for that particular doorway (e.g., the doorway may be in an old home with crooked walls or floors).

In another example, the computing device detects the type of computing device (e.g., smart phone model, operating system version) to determine if there are any adjustments to the pitch, yaw, roll or the threshold to determine it is substantially flat, based on the type of computing device. For example, the computing device may access a database to get adjustment data based on the particular type of device and then use that adjustment data to adjust or modify the data received from the one or more sensors for the computing device orientation.

After the computing device determines that the computing device is in a substantially flat position on the first surface, at operation 404 the computing device activates a camera on the opposite side of the computing device, such as front-facing camera located on a front-side of the computing device if the backside of the computing device is on the first surface or a back-facing camera located on a back-side of the computing device if the frontside of the computing device is on the first surface. In one example the camera (e.g., front-facing camera or back-facing camera) comprises a depth sensor, such as an infra-red sensor or LiDAR. Some examples of a camera system with a depth sensor include Apple's FaceID and Android's Face authentication. It is to be understood that these or other depth sensor technology can be used in example embodiments described herein.

In operation 406, the computing device detects a second surface in a camera view of the camera. For example, the computing device detects the other side of the doorway in the camera view of the front-facing or back-facing camera. In one example, the computing device detects the nearest object in the camera view which may or may not be the other side of the doorway. For example, the user may be standing in view of the camera or a plant or other object may be in between the camera and the other side of the doorway. In this case, the computing device can alert the user to move himself or herself out of the camera view or move the detected object out of the view.

In one example, the computing device can run a computer vision model trained to detect a doorframe or wall. The computing device can use the computer vision model to confirm that the camera view is indeed showing the other side of the doorframe.

In operation 408, the computing device analyzes measurements from the depth sensor. For example, the depth sensor may provide depth information for each of a plurality of pixels in an image in the camera-view of the camera. The computing device analyzes the measurement for each pixel to determine the minimum measurement of all the pixels. The measurement from the first surface to the second surface is set as the minimum measurement. The minimum measurement is used since it is important to be sure what the minimum access room is for the doorway (or hallway or other entry point) to know it is truly accessible.

Figure 8:
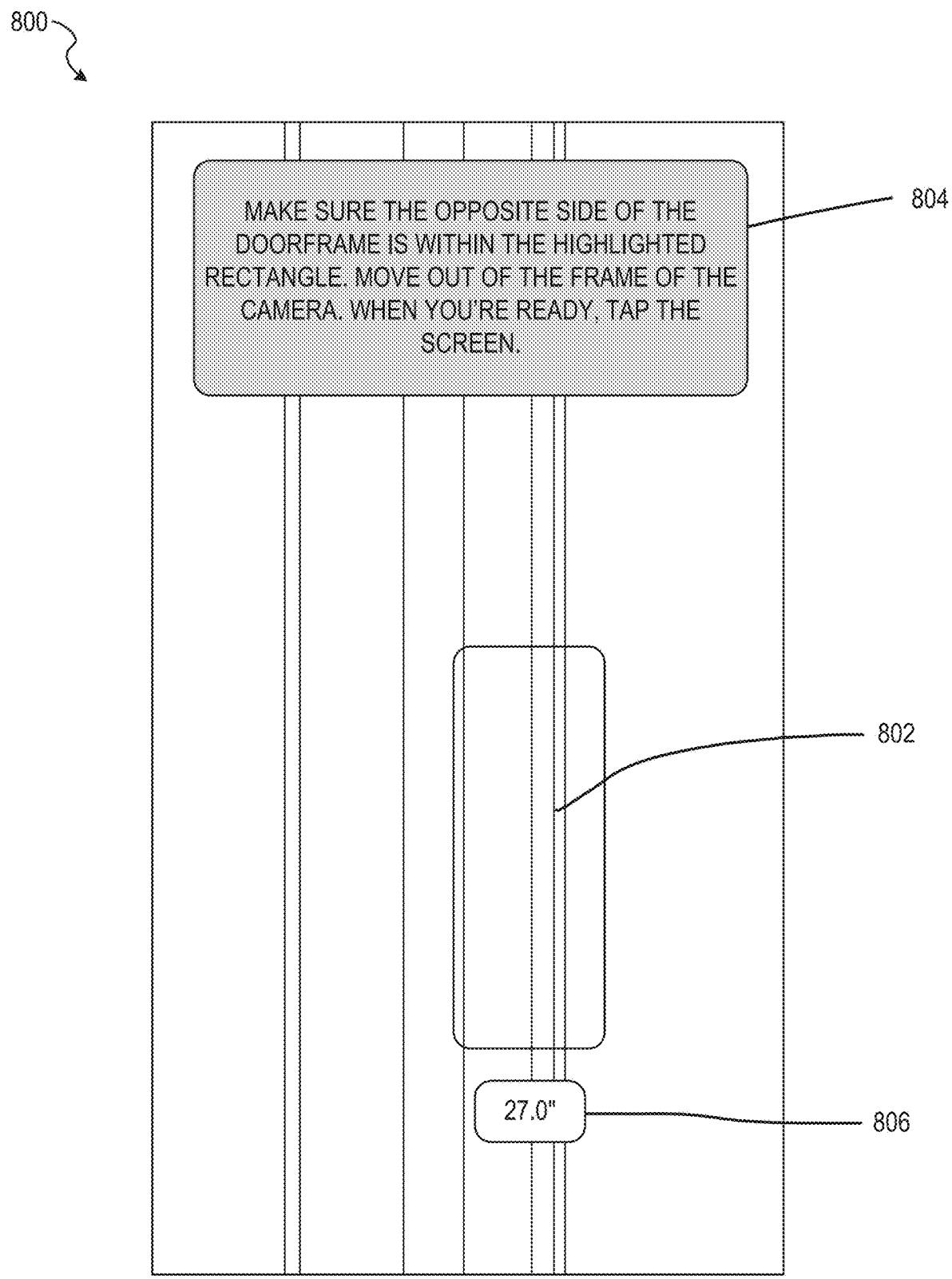

In one example, the computing device only analyzes the pixel measurements from the at least one depth sensor in a predefined area of the detected second surface to determine the minimum measurement of all the pixel measurements in the predefined area of the detected surface. As mentioned above, there may be measurement data available for all pixels (e.g., 10,000) in an image of the camera view of the camera. To make for more efficient processing, the computing device only analyzes pixels in a predefined area or region in the camera view (e.g., 200 pixels). This way the processing can be faster and less processor intensive. FIG. 8 illustrates an example user interface 800 that shows a predefined region 802 that is highlighted to indicate what will be measured by the computing system. The example user interface 800 also includes some instructions 804 for the user to be sure the camera view is on the desired second surface (e.g., the opposite side of the doorframe). The example user interface 800 also shows the current measurement 806 calculated by the computing system (e.g., the minimum measurement). This measurement can be calculated and shown in real-time or near real-time and can auto-update as the computing device is moved or adjusted.

Returning to FIG. 4, in operation 410 the computing device causes display of the minimum measurement from the first surface to the second surface overlaid on an image of the first and second surface in the camera view on the user interface of the computing device. For example, the computing device displays the calculated minimum measurement (e.g., 27.0" or 32.1") overlaid on an image of the doorway. In one example, the computing device switches from the front-facing camera to a back-facing camera by activating the back-facing camera, or switches from the back-facing camera to the front-facing camera by activating the front-facing camera. The camera view of the activated camera displays the calculated minimum measurement overlaid on an image of the doorway that is viewable in the camera view of the activated camera (e.g., via an augmented reality (AR) session).

Figure 9:
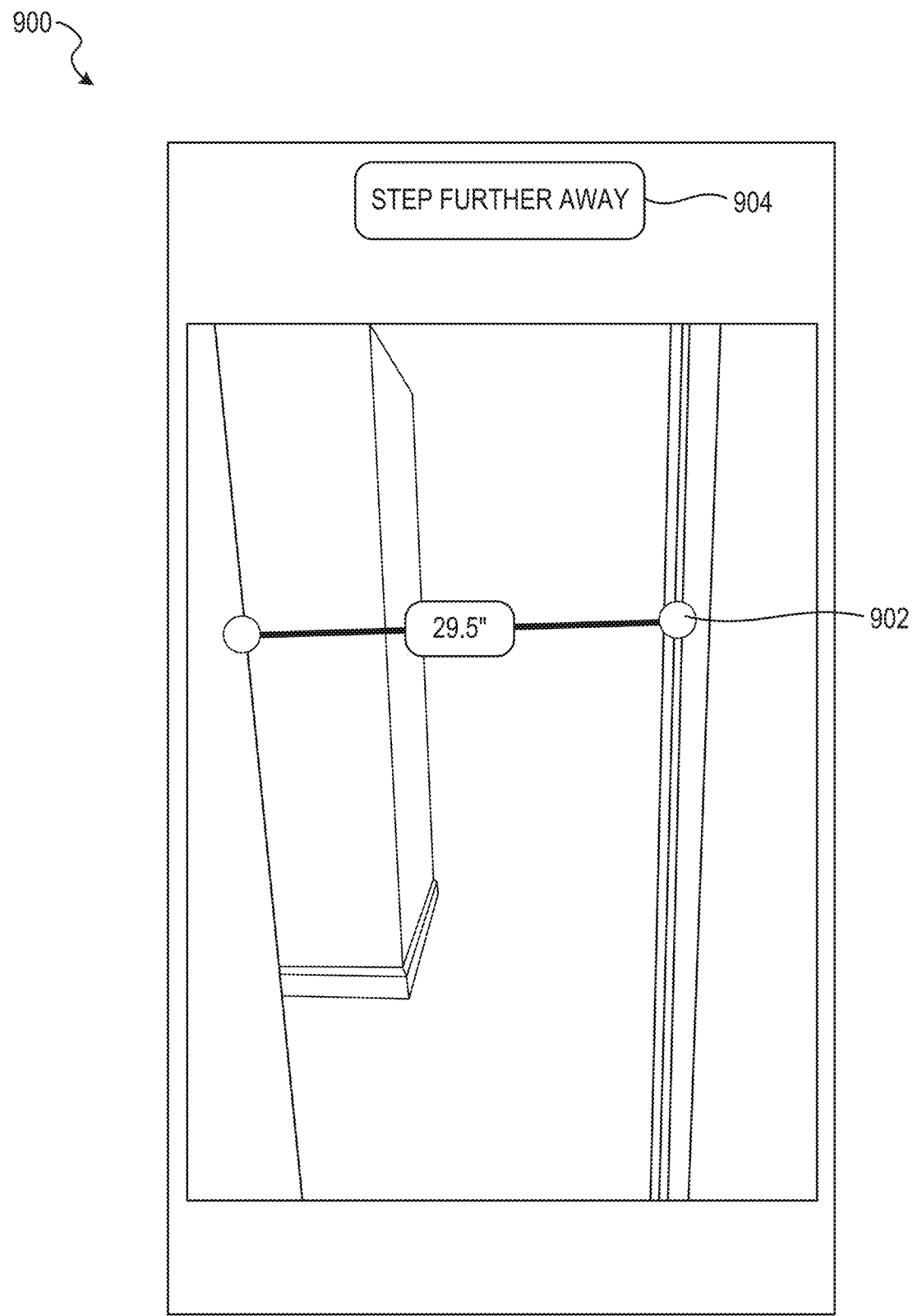

In one example, the minimum measurement is shown with a line between the first surface and the second surface (e.g., the two sides of the doorway). For example, the computing device sets a first coordinate of the computing device at a location where the computing device is placed on the first surface (e.g., an x, y or an x, y, z coordinate). The computing device projects a line perpendicular to the first coordinate to a point out to the minimum measurement on the second surface. The computing device overlays a line between the first coordinate and the point on the second surface. In one example, the first coordinate and the point on the second surface are each depicted as a dot overlaid on the image. In one example, the measurement (e.g., 27.0" or 32.1") is included with the line in the user interface. FIG. 9 illustrates an example user interface 900 depicting a camera view that shows the minimum measure and line 902 overlaid on an image of the doorway. As mentioned above, the measurement can be calculated and shown in real-time or near real-time and can auto-update as the computing device is moved or adjusted.

Returning to FIG. 4, at operation 412 the computing device captures an image of the display of the minimum measurement from the first surface to the second surface overlaid on the image of the first and second surface, via the camera (e.g., back-facing or front-facing camera) of the computing device.

In one example, the computing device can detect when the doorway or other feature is not substantially in the image. For example, the computing device detects that the first point where the computing device was on the first surface (e.g., the first coordinate) and a second point perpendicular to the first point (e.g., the point on the second surface) are not within a threshold position within the camera view of the camera (e.g., the camera view of the back-facing camera) of the computing device and cause instructions to display in the user interface to adjust the view of the display of the measurement from the first surface to the second surface overlaid on the image of the first and second surface. An example of such instructions 904 are shown in FIG. 9. In one example, computer vision can be used to determine whether the entire doorframe or door is visible in the image.

Figure 10:
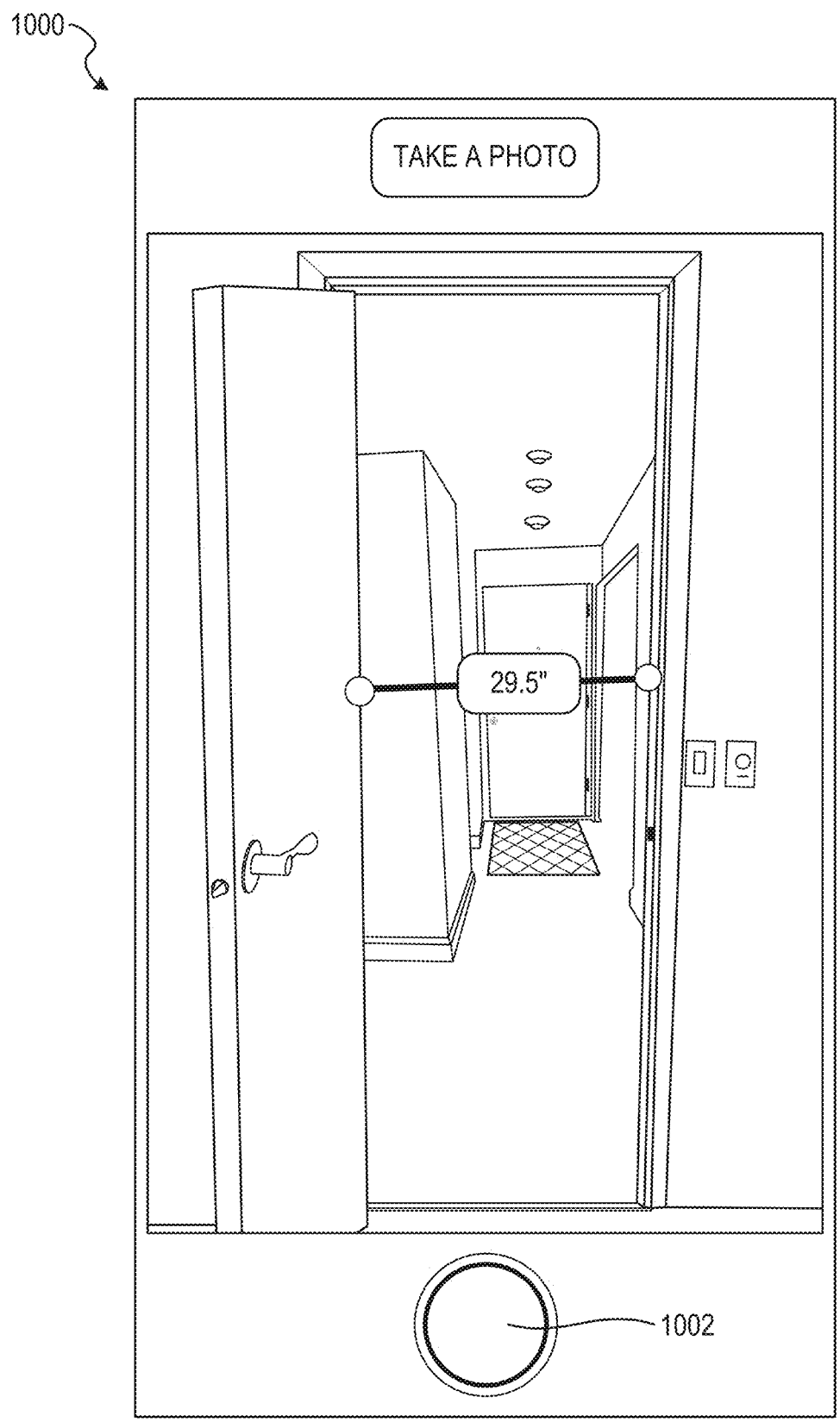

In one example, an option to capture the image of the display of the measurement from the first surface to the second surface overlaid on the image of the first and second surface is disabled until the computing device detects that the first point and second point are within the threshold position within the camera view. FIG. 10 illustrates an example user interface 1000 where the depiction of the measurement (e.g., 29.5") is within a threshold position of the camera view and thus, an option 1002 to capture the image is provided or enabled.

The captured image can be included with other images for the listing in the online marketplace. In addition, certain accessibility features can be listed for the listing if the doorway is the acceptable width for accessibility. In one example, raw data associated with the image and measurement, such as x and y coordinates of the points on each side of the doorframe, are also stored. In this way the depiction of the measurement can be recreated in a different style or manner using the x and y coordinates of each point. For example, the line can be depicted in a different style or color. Also, it is easier to detect if a user creates a fake image with measurements since the measurements would not be stored with the image and the user would not have gone through the process described herein to capture the image.

In one example, a first computing device of a first user may not have a camera with a depth sensor. In this example, the computing device can provide a scannable code (e.g., QR code), a link, or other means that can be provided to a second user computing device that does have a camera with a depth sensor. The second user device can perform the measurements described herein and then share them with the first computing device of the first user or post an image with the measurements directly to the listing in the online marketplace.

The above description uses a doorway as an example for generating an accessibility measurement. Example embodiments can also be used to measure a height of a counter, dining table, toilet, cooking stove, or other amenity where accessibility is needed. In these instances, the computing device would be held adjacent to the top or underside of the surface or object for which a height measurement is desired. Similar to what is described above for operation 402 of FIG. 4, the computing device determines that the computing device is in a substantially flat position adjacent to the surface or object. Then the computing device activates the camera of the computing device, as described above for operation 404, and detects a second surface in the camera view of the front-facing or back-facing camera (e.g., the floor), as described above for operation 406. The computing device analyzes pixel measurements from one or more depth sensors, as described above for operation 408, causes display of the minimum measurement overlaid on an image in the camera view (e.g., the image of the counter, dining table, etc.), as described above for operation 410, and captures an image of the display of the minimum measurement overlaid on the image, as described above for operation 412.

In another example, the computing device can be used to determine a ramp angle, such as for a ramp to enter an accommodation. In this example, the computing device is placed on the ramp at one or more locations. At each location the computing device analyzes one or more sensors to determine an orientation of the device and thus, a measurement of an angle of the ramp. The computing device can then cause display of the angle measurement overlaid on an image of the ramp and capture an image of the display of the angle measurement overlaid on the image of the ramp, as described above for operations 410 and 412. In a ramp with multiple section and/or angles, multiple placements on the ramp can be done to capture an angle of the ramp.

In view of the disclosure above, various examples are set forth below. It should be noted that one or more features of an example, taken in isolation or combination, should be considered within disclosure of this application.

Example 1. A computer-implemented method, comprising:
   analyzing, by a computing device, at least one sensor of the computing device to determine that the computing device is in a substantially flat position on a first surface;
   activating, by the computing device, a camera of the computing device, the camera comprising a depth sensor;
   detecting, by the computing device, a second surface in a camera view of the camera;
   analyzing, by the computing device, pixel measurements from the depth sensor in a predefined area of the detected second surface to determine a minimum measurement of all of the pixel measurements in the predefined area of the detected surface;
   causing display, by the computing device, of the minimum measurement from the first surface to the second surface overlaid on an image of the first and second surface in the camera view on a user interface of the computing device; and
   capturing, by the computing device, an image of the display of the minimum measurement from the first surface to the second surface overlaid on the image of the first and second surface.

Example 2. A computer-implemented method according to any of the previous examples, wherein before analyzing the at least one sensor of the computing device to determine that the computing device is in a substantially flat position on a first surface, the method comprises:
   prompting, via the user interface of the computing device, a user to place a font-side or back-side of the computing device on the first surface.

Example 3. A computer-implemented method according to any of the previous examples, wherein analyzing the at least one sensor of the computing device to determine that the computing device is in a substantially flat position on the first surface comprises determining that the yaw, pitch, and roll detected by the at least one sensor is zero or close to zero.

Example 4. A computer-implemented method according to any of the previous examples, therein the at least one sensor of the computing device is an accelerometer or a gyroscope.

Example 5. A computer-implemented method according to any of the previous examples, wherein the first surface is one side of a doorframe and the second surface is an opposite other side of the doorframe.

Example 6. A computer-implemented method according to any of the previous examples, further comprising:
   causing the image to be included with other images for a listing in an online marketplace.

Example 7. A computer-implemented method according to any of the previous examples, further comprising:
   setting a first coordinate of the computing device at a location where the computing device is placed on the first surface;
   projecting a line perpendicular from the first coordinate to a point out to the minimum measurement on the second surface; and
   overlaying a line between the first coordinate on the first surface and the point on the second surface, wherein the display of the minimum measurement from the first surface to the second surface overlaid on the image of the first and second surface comprises the line.

Example 8. A computer-implemented method according to any of the previous examples, wherein before capturing the image of the display of the minimum measurement from the first surface to the second surface overlaid on the image of the first and second surface, the method comprises:
   detecting that a first point where the computing device was on the first surface and a second point perpendicular to the first point are not within a threshold position within a camera view of the computing device; and causing instructions to display in the user interface to adjust the view of the display of the minimum measurement from the first surface to the second surface overlaid on the image of the first and second surface.

Example 9. A computer-implemented method according to any of the previous examples, wherein an option to capture the image of the display of the minimum measurement from the first surface to the second surface overlaid on the image of the first and second surface is disabled until the computing device detects that the first point and second point are within the threshold position within the camera view.

Example 10. A computing device comprising:
   a memory that stores instructions; and
   one or more processors configured by the instructions to perform operations comprising:
      analyzing at least one sensor of the computing device to determine that the computing device is in a substantially flat position on a first surface;
      activating a camera of the computing device, the camera comprising a depth sensor;
      detecting a second surface in a camera view of the camera;
      analyzing pixel measurements from the depth sensor in a predefined area of the detected second surface to determine a minimum measurement of all of the pixel measurements in the predefined area of the detected surface;
      causing display of the minimum measurement from the first surface to the second surface overlaid on an image of the first and second surface in the camera view on a user interface of the computing device; and
      capturing an image of the display of the minimum measurement from the first surface to the second surface overlaid on the image of the first and second surface.

Example 11. A computing device according to any of the previous examples, wherein before analyzing the at least one sensor of the computing device to determine that the computing device is in a substantially flat position on a first surface, the operations comprise:
   prompting, via the user interface of the computing device, a user to place a front-side or back-side of the computing device on the first surface.

Example 12. A computing device according to any of the previous examples, wherein analyzing the at least one sensor of the computing device to determine that the computing device is in a substantially flat position on the first surface comprises determining that the yaw, pitch, and roll detected by the at least one sensor is zero or close to zero.

Example 13. A computing device according to any of the previous examples, therein the at least one sensor of the computing device is an accelerometer or a gyroscope.

Example 14. A computing device according to any of the previous examples, wherein the first surface is one side of a doorframe and the second surface is an opposite other side of the doorframe.

Example 15. A computing device according to any of the previous examples, the operations further comprising: causing the image to be included with other images for a listing in an online marketplace.

Example 16. A computing device according to any of the previous examples, the operations further comprising:
setting a first coordinate of the computing device at a location where the computing device is placed on the first surface;
projecting a line perpendicular from the first coordinate to a point out to the minimum measurement on the second surface; and
overlaying a line between the first coordinate on the first surface and the point on the second surface, wherein the display of the minimum measurement from the first surface to the second surface overlaid on the image of the first and second surface comprises the line.

Example 17. A computing device according to any of the previous examples, wherein before capturing the image of the display of the minimum measurement from the first surface to the second surface overlaid on the image of the first and second surface, the operations comprise:
detecting that a first point where the computing device was on the first surface and a second point perpendicular to the first point are not within a threshold position within a camera view of a camera of the computing device; and
causing instructions to display in the user interface to adjust the view of the display of the minimum measurement from the first surface to the second surface overlaid on the image of the first and second surface.

Example 18. A computing device according to any of the previous examples, wherein an option to capture the image of the display of the minimum measurement from the first surface to the second surface overlaid on the image of the first and second surface is disabled until the computing device detects that the first point and second point are within the threshold position within the camera view.

Example 19. A nontransitory computer-readable medium comprising instructions stored thereon that are executable by at least one processor to cause a computing device to perform operations comprising:
analyzing at least one sensor of the computing device to determine that the computing device is in a substantially flat position on the first surface; activating a camera of the computing device, the camera comprising a depth sensor;
detecting a second surface in a camera view of the camera;
analyzing pixel measurements from the depth sensor in a predefined area of the detected second surface to determine a minimum measurement of all of the pixel measurements in the predefined area of the detected surface;
causing display of the minimum measurement from the first surface to the second surface overlaid on an image of the first and second surface in the camera view on a user interface of the computing device; and
capturing an image of the display of the minimum measurement from the first surface to the second surface overlaid on the image of the first and second surface.

Example 20. A nontransitory computer-readable medium according to any of the previous examples, the operations further comprising:
setting a first coordinate of the computing device at a location where the computing device is placed on the first surface;
projecting a line perpendicular from the first coordinate to a point out to the minimum measurement on the second surface; and
overlaying a line between the first coordinate on the first surface and the point on the second surface, wherein the display of the minimum measurement from the first surface to the second surface overlaid on the image of the first and second surface comprises the line.

Figure 11:
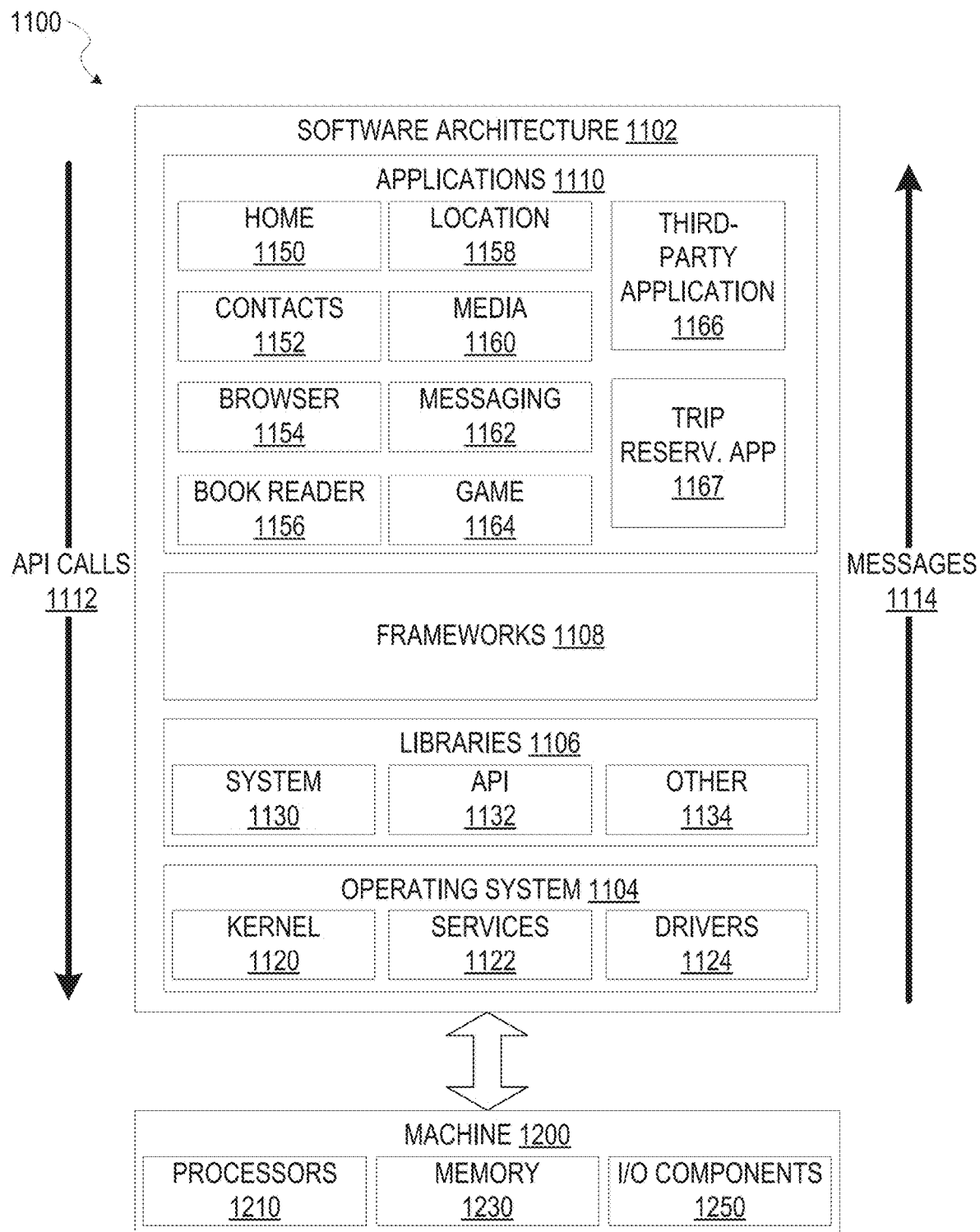
FIG. 11 is a block diagram illustrating an example of a software architecture that may be installed on a machine, according to some example embodiments.

FIG. 11 is a block diagram 1100 illustrating a software architecture 1102, which can be installed on any one or more of the devices described above. For example, in various embodiments, the client device 110 and server systems 130, 102, 120, 122, and 124 may be implemented using some or all of the elements of the software architecture 1102. FIG. 11 is merely a nonlimiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionalities. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications, such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Some embodiments may particularly include a trip reservation application 1167, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 1167 may request and display various data related to an online marketplace and may provide the capability for a user 106 to input data related to the system via voice, a touch interface, or a keyboard, or using a camera device of the machine 1200, communication with a server system via the I/O components 1250, and receipt and storage of object data in the memory 1230. Presentation of information and user inputs associated with the information may be managed by the trip reservation application 1167 using different frameworks 1108, library 1106 elements, or operating system 1104 elements operating on a machine 1200.

Figure 12:
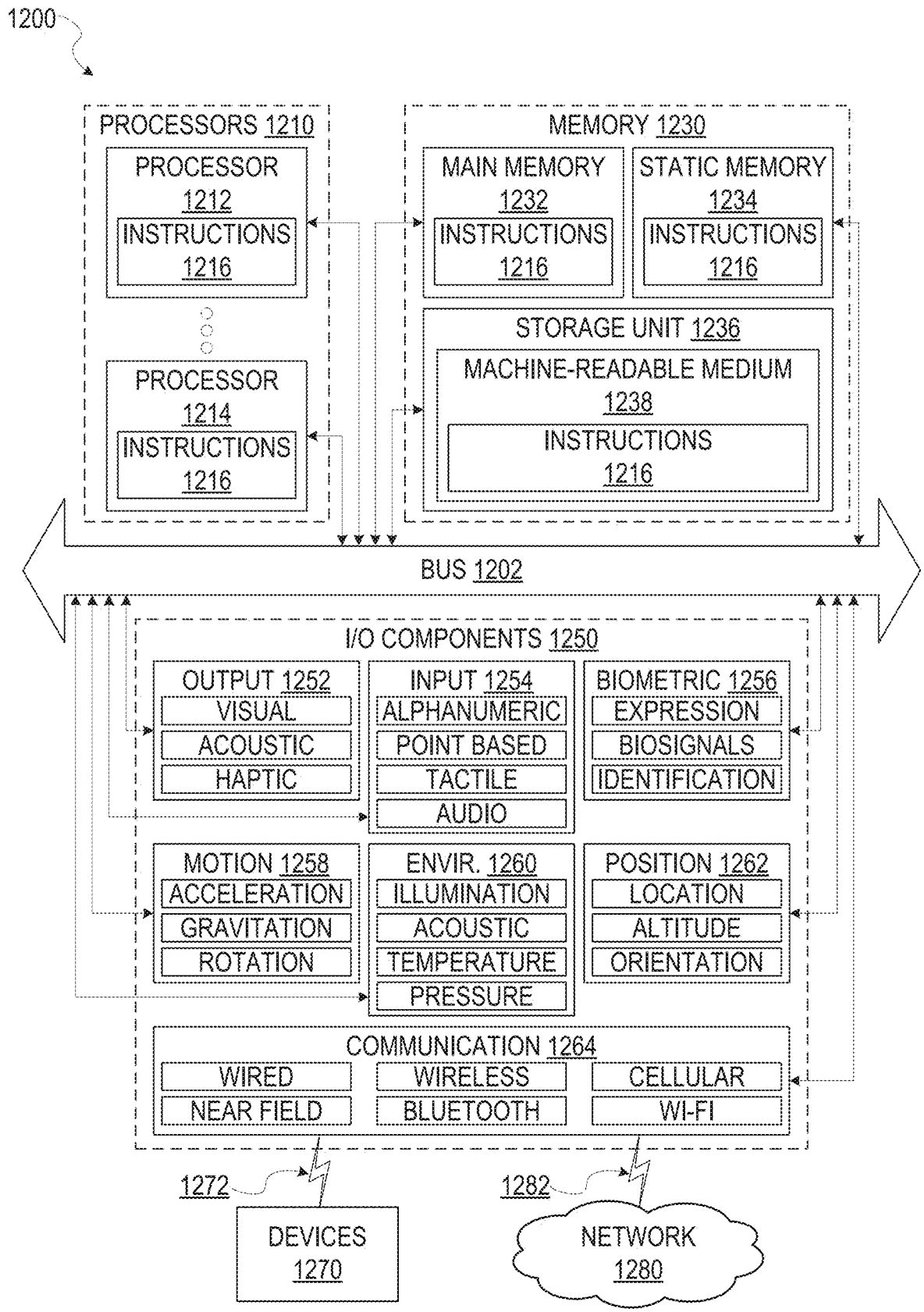
FIG. 12 illustrates a diagrammatic representation of a machine, in the form of a computer system, within which a set of instructions may be executed for causing the machine to perform any one or more of the methodologies discussed herein, according to an example embodiment.

FIG. 1200 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server system 130, 102, 120, 122, 124, and the like, or a client device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1212, 1214 with multiple cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes nonstatutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, eye tracking), measure biosignals (e.g., blood pressure, heart rate, body temperature, perspiration, brain waves), identify a person (e.g., voice identification, retinal identification, facial identification, fingerprint identification, electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a USB).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect one-dimensional bar codes such as a Universal Product Code (UPC) bar code, multidimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a VPN, a LAN, a WLAN, a WAN, a WWAN, a MAN, the internet, a portion of the internet, a portion of the PSTN, a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile (GSM) communications connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., HTTP). Similarly, in other example embodiments, the instructions 1216 are transmitted or received using a transmission medium via the coupling 1272 (e.g., peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "nontransitory" should not be construed to mean that the medium is incapable of movement; the machine-readable medium 1238 should be considered as being transportable from one physical location to another. Additionally, since the machine-readable medium 1238 is tangible, the machine-readable medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
   detecting, by a computing device on a first surface, a second surface in a camera view of a camera of the computing device;
   analyzing, by the computing device, pixel measurements from a depth sensor of the camera in a predefined area of the detected second surface to determine a minimum measurement of all of the pixel measurements in the predefined area of the detected second surface; and
   causing display, by the computing device, of the minimum measurement from the first surface to the second surface overlaid on an image of the first and second surface in the camera view on a user interface of the computing device.

2. The computer-implemented method of claim 1, wherein before detecting the second surface the method comprises:
   analyzing at least one sensor of the computing device to determine that the computing device is in a substantially flat position on the first surface.

3. The computer-implemented method of claim 2, wherein analyzing the at least one sensor of the computing device to determine that the computing device is in a substantially flat position on the first surface comprises determining that a yaw, pitch, and roll detected by the at least one sensor is zero or close to zero.

4. The computer-implemented method of claim 2, wherein the at least one sensor of the computing device is an accelerometer or a gyroscope.

5. The computer-implemented method of claim 1, wherein the first surface is one side of a doorframe and the second surface is an opposite other side of the doorframe.

6. The computer-implemented method of claim 1, further comprising:

capturing an image of the display of the minimum measurement from the first surface to the second surface overlaid on the image of the first and second surface; and causing the image to be included with other images for a listing in an online marketplace.

7. The computer-implemented method of claim 6, further comprising:

setting a first coordinate of the computing device at a location where the computing device is placed on the first surface;

projecting a line perpendicular from the first coordinate to a point out to the minimum measurement on the second surface; and overlaying a line between the first coordinate on the first surface and the point on the second surface, wherein the display of the minimum measurement from the first surface to the second surface overlaid on the image of the first and second surface comprises the line.

8. The computer-implemented method of claim 6, wherein before capturing the image of the display of the minimum measurement from the first surface to the second surface overlaid on the image of the first and second surface, the method comprises:

detecting that a first point where the computing device was on the first surface and a second point perpendicular to the first point are not within a threshold position within a camera view of a camera of the computing device; and causing instructions to display in the user interface to adjust the view of the display of the minimum measurement from the first surface to the second surface overlaid on the image of the first and second surface.

9. The computer-implemented method of claim 8, wherein an option to capture the image of the display of the minimum measurement from the first surface to the second surface overlaid on the image of the first and second surface is disabled until the computing device detects that the first point and second point are within the threshold position within the camera view.

10. The computer-implemented method of claim 1, wherein the predefined area comprises a portion of an image of the detected second surface in the camera view.

11. A computing device comprising:

a memory that stores instructions; and one or more processors configured by the instructions to perform operations comprising:

detecting, by the computing device on a first surface, a second surface in a camera view of a camera of the computing device;

analyzing pixel measurements from a depth sensor of the camera in a predefined area of the detected second surface to determine a minimum measurement of all of the pixel measurements in the predefined area of the detected second surface; and causing display of the minimum measurement from the first surface to the second surface overlaid on an image of the first and second surface in the camera view on a user interface of the computing device.

12. The computing device of claim 11, wherein before detecting the second surface the operations comprise:

analyzing at least one sensor of the computing device to determine that the computing device is in a substantially flat position on the first surface.

13. The computing device of claim 12, wherein analyzing the at least one sensor of the computing device to determine that the computing device is in a substantially flat position on the first surface comprises determining that a yaw, pitch, and roll detected by the at least one sensor is zero or close to zero.

14. The computing device of claim 12, wherein the at least one sensor of the computing device is an accelerometer or a gyroscope.

15. The computing device of claim 11, wherein the first surface is one side of a doorframe and the second surface is an opposite other side of the doorframe.

16. The computing device of claim 11, the operations further comprising:

capturing an image of the display of the minimum measurement from the first surface to the second surface overlaid on the image of the first and second surface; and causing the image to be included with other images for a listing in an online marketplace.

17. The computing device of claim 16, the operations further comprising:

setting a first coordinate of the computing device at a location where the computing device is placed on the first surface;

projecting a line perpendicular from the first coordinate to a point out to the minimum measurement on the second surface; and overlaying a line between the first coordinate on the first surface and the point on the second surface, wherein the display of the minimum measurement from the first surface to the second surface overlaid on the image of the first and second surface comprises the line.

18. The computing device of claim 16, wherein before capturing the image of the display of the minimum measurement from the first surface to the second surface overlaid on the image of the first and second surface, the operations comprise:

detecting that a first point where the computing device was on the first surface and a second point perpendicular to the first point are not within a threshold position within a camera view of a camera of the computing device; and causing instructions to display in the user interface to adjust the view of the display of the minimum measurement from the first surface to the second surface overlaid on the image of the first and second surface.

19. The computing device of claim 18, wherein an option to capture the image of the display of the minimum measurement from the first surface to the second surface overlaid on the image of the first and second surface is disabled until the computing device detects that the first point and second point are within the threshold position within the camera view.

20. A non-transitory computer-readable medium comprising instructions stored thereon that are executable by at least one processor to cause a computing device to perform operations comprising:

detecting, by the computing device on a first surface, a second surface in a camera view of a camera of the computing device;

analyzing pixel measurements from a depth sensor of the camera in a predefined area of the detected second surface to determine a minimum measurement of all of the pixel measurements in the predefined area of the detected second surface; and causing display of the minimum measurement from the first surface to the second surface overlaid on an image of the first and second surface in the camera view on a user interface of the computing device.

* * * * *